Figure 1:
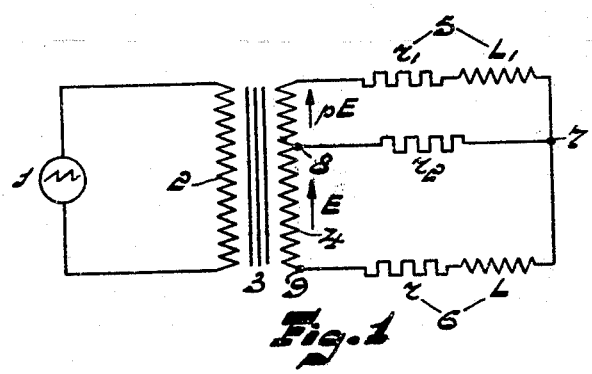

Nov. 29, 1949  J. HAANTJES ET AL  2,489,374
CIRCUIT-ARRANGEMENT FOR PRODUCING A SAWTOOTH
CURRENT IN INDUCTANCE COILS
Filed May 3, 1947

J. HAANTJES & J.J.P. VALETON
INVENTORS

BY
AGENT

Patented Nov. 29, 1949

2,489,374

UNITED STATES PATENT OFFICE 2,489,374

CIRCUIT ARRANGEMENT FOR PRODUCING A SAW-TOOTH CURRENT IN INDUCTANCE COILS

Johan Haantjes and Josué Jean Philippe Valeton, Eindhoven, Netherlands, assignors to Hartford National Bank and Trust Company, Hartford, Conn., as trustee Application May 3, 1947, Serial No. 745,774
In the Netherlands May 10, 1946

5 Claims. (Cl. 315—27)

This invention concerns a circuit-arrangement for producing a sawtooth current in an inductance coil having a given inductance and resistance. This coil is inserted in a circuit connected to the secondary winding of a transformer, across which winding an impulse-shaped voltage is supplied by a generator inserted in the primary circuit of the transformer, the said voltage having a constant value between the pulses and for a time exceeding the duration of each impulse.

This circuit-arrangement can be used, for instance, for deflecting cathode rays in cathode-ray tubes, in which the coil is used as a deflecting coil. When connecting the coil in a known manner directly to the secondary winding of the transformer, then, due to the fact that the coil has a given resistance the sawtooth current will not vary linearly with time during the sweep. Considering the use of the circuit, however, such a variation is usually desired.

Assuming a coil having a direct voltage designated as E abruptly supplied to it, and having an inductance designated as L and resistance designated as $r$; the sawtooth current resulting is not linear. The current is given by the general expression:

$$i = \frac{E}{r}\left(1 - e^{-\frac{rt}{L}}\right)$$

where $t$ represents the time and $e$ is the natural base. It can be seen that the deviation from linearity is proportional to the exponent $$\frac{r}{L}$$

and time $t$. If this coil is connected directly to the secondary winding of the transformer, it appears that the deviation from linearity is likewise proportional to $$\frac{r}{L}$$

and to the periodic time of the voltage applied.

The periodic time is usually prescribed in conjunction with the use of the coil, and $$\frac{r}{L}$$

cannot be made arbitrarily small both on account of the cost involved and in view of the fact that, considering the use of the coil, a limit is set to the maximum proportions or by other requirements.

The present invention has for its purpose, to provide a circuit arrangement in which the deviation from linearity of the sawtooth current through the coil is much smaller than in conventional circuits. It is based on the recognition that this deviation is mainly due to phase-distortion for the diverse frequencies of the components into which the applied voltage can be split up.

If the applied voltage is split up into sinusoidal components, the current $i$ through the coil would, in the ideal case, require to be $$i = \frac{E}{j\omega L}$$

where $\omega = 2\pi f$, E=applied voltage, $f$=frequency and L represents inductance. Owing to the resistance $r$, of the coil, current becomes $$i = \frac{E}{r + j\omega L} = \frac{E}{j\omega L} \times \frac{j\omega L}{r + j\omega L}$$

The second factor $$\frac{j\omega L}{r + j\omega L}$$

causes the deviation from the ideal case. A linear sawtooth current would be obtained only if this factor were constant for all frequencies. The tangent of the phase angle of this factor $$\frac{r}{\omega L}$$

controlling the deviation from linearity, approaches zero at high frequencies, but has a considerable value for lower frequencies of which the lowest is the fundamental frequency of the sawtooth current.

The circuit according to the invention permits this value of the tangent of the phase angle to be reduced to a smaller value at low frequencies. As a result, the desired linearity of the sawtooth current through the coil is closely approximated.

The circuit according to the invention exhibits the feature that the circuit connected to the secondary of the transformer comprises an auxiliary coil having an inductance and resistance equal to that of the original coil. This auxiliary coil and the main inductance coil are connected in series across the secondary of the transformer. The junction point of the two coils is connected through a resistance to a point on the secondary of the transformer.

Figure 2:
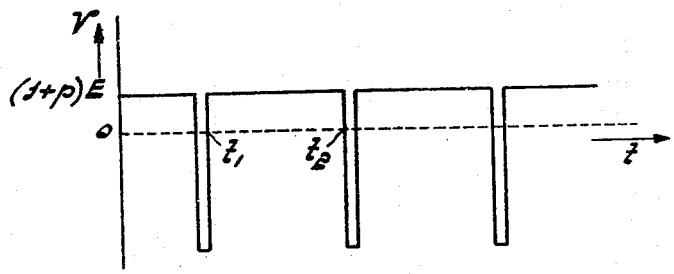
Figure 3:
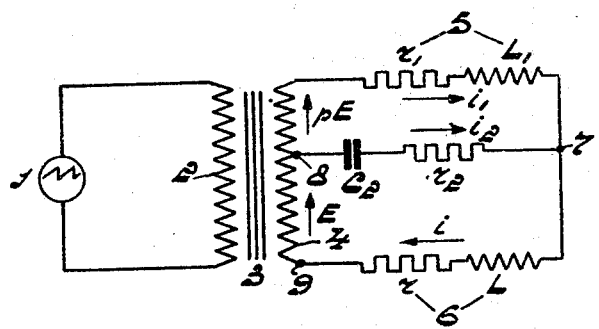

Such a circuit is represented diagrammatically in Fig. 1, Fig. 2 representing the voltage developed across the secondary of the transformer. Figure 3 is a modification of Figure 1.

In Fig. 1, I represents a sawtooth generator the construction of which is not vital to the invention and which produces a sawtooth current in the primary 2 of transformer 3. A voltage is developed across the secondary 4, which is constant during the sweep of the sawtooth current.

Such a voltage is designated as V and is represented in Fig. 2 as a function of the time. During the sweep of the sawtooth current through the primary of the transformer, for instance from time $t_1$ to $t_2$, the voltage across the secondary is constant and equal to $(1+p) E$, where E represents secondary voltage on one side of point 8 and $pE$ represents secondary voltage on the other side of point 8. $p$ is a constant, explained below.

The auxiliary coil 5 has an inductance $L_1$ and resistance $r_1$ and coil 6 has an inductance L and resistance $r$. Coils 5 and 6 are connected in series with the secondary 4 shown in Fig. 1. In practice $L \neq L_1$, and $r \neq r_1$. A resistance $r_2$, is connected between point 7, the junction of the two coils 5 and 6, and point 8 of the secondary winding.

Point 8 is chosen to be such that the voltage between this point and the other end 9, of coil 6 is $$\frac{1}{1+p}$$

times the total voltage across the secondary winding. Hence $$\frac{1}{1+p} \times (1+p) E = E$$

E is therefore the voltage between 8 and 9. By means of such a circuit it proves to be feasible, as will be explained hereinafter, to obtain a closer approximation to the linear variation of the sawtooth current through coil 6 than if this coil is connected directly to the secondary 4, provided $p$ and L be chosen in a manner such that $pL$ exceeds $L_1$.

The closest approximation is obtained if $L_1$, $r_1$, $r_2$ and $p$ are chosen to be such that $$r_2 = \frac{rL_1}{pL - L_1}$$

If this condition is satisfied, it appears that the tangent of the phase angle of the factor controlling the deviation from linearity, has the lowest possible value at low frequencies. The variation of the tangent as a function of the frequency is also as small as possible. In all these equations, if E is expressed in volts, $r$, $r_1$ and $r_2$ can be expressed in ohms, L and $L_1$ in henries, and $i$ in amperes and $f$ in cycles per second.

According to a further suitable form of construction of the circuit arrangement according to the invention, the circuit including the resistance $r_2$ has added a capacity $C_2$, which is connected in series with the said resistance. By means of this capacity it is feasible to influence the modulus of the factor bringing about the deviation from linearity of the current, in a manner such that this modulus also varies only slightly as a function of the frequency. This variation is a minimum if $C_2$ be so chosen that $$C_2 = \frac{rL_1}{r_2(rr_1 + rr_2 + r_1r_2)}$$

Figure 3 represents a circuit as in Fig. 1, containing the capacity $C_2$.

If the voltage set up across the secondary winding 4 is imagined to be split up into sinusoidal components and if coil 5 shown in Fig. 3 is traversed by the current $i_1$, the circuit having a resistance $r_2$ and a capacity $C_2$ being traversed by a current $i_2$ and coil 6 by a current $i$, the following equations may be deduced from Kirchoff's laws:

$$pE = i_1(r_1 + j\omega L_1) - i_2\left(r_2 + \frac{1}{j\omega C_2}\right)$$

$$E = i(r + j\omega L) + i_2\left(r_2 + \frac{1}{j\omega C_2}\right)$$

$$i_2 = i - i_1$$

Upon reduction we have:

$$i = \frac{E}{j\omega L} \times \left[ \frac{(1+p)r_2 + r_1 j\omega L - \omega^2 L L_1 + (1+p) L/C_2}{(r_1 r + r_2 r_1 + r r_2) + \frac{L + L_1}{C_2} + j\omega(r_1 L + r_2 L + r_2 L_1 + r L_1) - \omega^2 L L_1 + \frac{r_1 + r}{j\omega C_2}} \right]$$

where the factor between brackets is responsible for the deviation from linearity of the sawtooth current through coil 6. For the sake of clarity this may be written:

$$\frac{a + jb\omega + c\omega^2}{j\frac{d}{\omega} + e + jf\omega + g\omega^2}$$

where the coefficients of from $a$ to $g$ inclusive represent functions of the resistances, inductances and $C_2$. Upon solving this equation for the tangent of the phase angle, it is found that the prime requisite for reducing the value of this tangent to a value smaller than with known circuits, appears to be that $pL$ should exceed $L_1$. This means that the current traversing the auxiliary coil 5 exceeds the current through coil 6.

The tangent of the phase angle of this expression is as low as possible for all frequencies if $b_g = e_f$. It follows upon substitution, that $$r_2 = \frac{rL_1}{pL - L_1}$$

So far the conditions obtained correspond to those found for the circuit shown in Fig. 1. Consequently these conditions yield a smaller influence of the variation of the phase angle as a function of the frequency.

The presence of $C_2$ permits the variation of the absolute value of the factor causing the deviation, as a function of the frequency, to be kept as small as possible. The optimum case occurs if $$\frac{a}{e} = \frac{b}{f} = \frac{c}{g}$$

whence it follows that $$C_2 = \frac{rL_1}{r_2(rr_1 + rr_2 + r_1r_2)}$$

The behaviour of the factor causing the deviation, as a function of the frequency, consequently approaches to the ideal case viz. a constant, with the result that the linear form of the sawtooth current through coil $b$ is closely approximated. By way of example, a circuit devolved by the preceding equation may have one set of practical values:

L=3 milhenries
$L_1$=0.15 henries
$r$=3 ohms
$r_1$=0.015 ohms
$r_2$=3 ohms
$C_2$=17 microfarads

What we claim is:

1. A circuit arrangement to produce sawtooth electric variations in an inductance coil having an inductance designated L and a resistance component, comprising a transformer with primary and tapped secondary windings, a source of alternating current having a stepped wave shape of given magnitude coupled to the primary winding of the said transformer, an auxiliary coil having an inductance designated $L_1$ and a given resistance component joined in series with one end of the inductance coil and with one end of the secondary winding of the said transformer, a coupling between the free end of the inductance coil and the free end of the secondary winding of the said transformer, and impedance means to couple the junction of the auxiliary and inductance coil and the secondary winding tap of the said transformer, said tap having a position at which the voltage between the said tap and the free end of the secondary winding of the said transformer is $$\frac{1}{1+p}$$

times the total secondary voltage, where $pL>L_1$, $p$ is a constant, and $L$ and $L_1$, are expressed in henries.

2. A circuit arrangement to produce sawtooth electric variations in a kinescope deflection coil having an inductance designated $L$ and a resistance component, comprising a transformer with primary and tapped secondary windings, a source of alternating current having a stepped wave shape of given magnitude coupled to the primary winding of the said transformer, an auxiliary coil having an inductance designated $L_1$ and a given resistance component joined in series with one end of the deflection coil and with one end of the secondary winding of the said transformer, a coupling between the free end of the deflection coil and the free end of the secondary winding of the said transformer, and impedance means to couple the junction of the auxiliary and inductance coil and the secondary winding tap of the said transformer, said tap having a position at which the voltage between the said tap and the free end of the secondary winding of the said transformer is $$\frac{1}{1+p}$$

times the total secondary voltage, where $pL>L_1$, and $p$ is a constant, and $L$ and $L_1$, are expressed in henries.

3. In a kinescope deflection circuit, a circuit arrangement to produce sawtooth electric variations in a deflection coil having an inductance L and a resistance designated $r$, comprising a transformer with primary and tapped secondary windings, a source of alternating current having a stepped wave shape of given magnitude coupled to the primary winding of the said transformer, an auxiliary coil having an inductance $L_1$ and a resistance designated $r_1$ joined in series with one end of the inductance coil and with one end of the secondary winding of the said transformer, a coupling between the free end of the inductance coil and the free end of the secondary winding of the said transformer, a resistive element designated $r_2$ to couple the junction of the auxiliary and inductance coil and the secondary winding tap of the said transformer, said tap having a position at which the voltage between the said tap and the free end of the secondary winding of the said transformer is $$\frac{1}{1+p}$$

times the total secondary voltage, where $pL>L_1$, and said resistive element and auxiliary and deflection coil having values at which $$r_2 = \frac{rL_1}{pL-L_1}$$

where:
$p$ = constant
$L$ and $L_1$ = inductance in henries
$r$ and $r_2$ = resistance in ohms 4. In a kinescope deflection circuit, a circuit arrangement to produce sawtooth electric variation in a deflection coil having an inductance L and a resistance designated $r$, comprising a transformer with primary and tapped secondary windings, a source of alternating current having a stepped wave shape of given magnitude coupled to the primary winding of the said transformer, an auxiliary coil having an inductance $L_1$ and a resistance designated $r_1$ joined in series with one end of the inductance coil and with one end of the secondary winding of the said transformer, a coupling between the free end of the inductance coil and the free end of the secondary winding of the said transformer, a capacitive element, a resistive element designated $r_2$, means to couple the said resistive and capacitive elements in series between the junction of the auxiliary and inductance coil and the secondary winding tap of the said transformer, said tap having a position at which the voltage between the said tap and the free end of the secondary winding of the said transformer is $$\frac{1}{1+p}$$

times the total secondary voltage, where $pL>L_1$, and said resistive element and auxiliary and deflection coil having values at which $$r_2 = \frac{rL_1}{pL-L_1}$$

where:
$p$ = constant
$L$ and $L_1$ = inductance in henries
$r$ and $r_2$ = resistance in ohms 5. In a kinescope deflection circuit, a circuit arrangement to produce sawtooth electric variations in a deflection coil having an inductance L and a resistance designated $r$, comprising a transformer with primary and tapped secondary windings, a source of alternating current having a stepped wave shape of given magnitude coupled to the primary winding of the said transformer, an auxiliary coil having an inductance $L_1$ and a resistance designated $r_1$ joined in series with one end of the inductance coil and with one end of the secondary winding of the said transformer, a coupling between the free end of the inductance coil and the free end of the secondary winding of the said transformer, a capacitive element designated $C_2$, a resistive element designated $r_2$, means to couple the said resistive and capacitive elements in series between the junction of the auxiliary and inductance coil and the secondary winding tap of the said transformer, said tap having a position at which the voltage between the said tap and the free end of the secondary winding of the said transformer is $$\frac{1}{1+p}$$

times the total secondary voltage, where $pL>L_1$, and said resistive and capacitive elements and auxiliary and deflection coil having values at which $$r_2 = \frac{rL_1}{pL - L_1}$$

$$C_2 = \frac{rL_1}{r_2(rr_1 + rr_2 + r_1r_2)}$$

where:
- $p$ = constant
- $L$ and $L_1$ = inductance in henries
- $r_1$ and $r_2$ = resistance in ohms
- $C_2$ = capacity in farads

JOHAN HAANTJES.
JOSUÉ JEAN PHILIPPE VALETON.

REFERENCES CITED

The following references are of record in the file of this patent:

UNITED STATES PATENTS

| Number | Name | Date |
|---|---|---|
| 2,382,822 | Schade | Aug. 14, 1945 |

FOREIGN PATENTS

| Number | Country | Date |
|---|---|---|
| 552,688 | Great Britain | Apr. 20, 1943 |